US012583367B2

(12) United States Patent
 Kim et al.

(10) Patent No.: US 12,583,367 B2
(45) Date of Patent: Mar. 24, 2026

(54) DUAL RELEASE ACTUATOR FOR VEHICLE SEAT AND METHOD FOR CONTROLLING THE SAME

(71) Applicants:Hyundai Motor Company, Seoul (KR); Kia Corporation, Seoul (KR); Hyundai Transys Inc., Seosan-si (KR); Keyang Electric Machinery Co., Ltd., Seoul (KR)

(72) Inventors: Jae Wook Kim, Ulsan (KR); Sang Soo Lee, Hwaseong-si (KR); Deok Soo Lim, Hwaseong-si (KR); Hyun Wook Lim, Gwangju (KR); Sang Ho Lee, Andong-si (KR); Sang Hark Lee, Incheon (KR); Hak Cheol Lee, Suwon-si (KR); Deok Ki Kim, Seoul (KR); Byeong Deok Choi, Ansan-si (KR); Hoe Cheon Kim, Anyang-si (KR); Hwa Young Mun, Hwaseong-si (KR); Seung Yeop Lee, Siheung-si (KR); Cheol Hwan Yoon, Hwaseong-si (KR); Jung Bin Lee, Hwaseong-si (KR); Byung Ju Kang, Ansan-si (KR)

(73) Assignees: Hyundai Motor Company, Seoul (KR); Kia Corporation, Seoul (KR); Hyundai Transys Inc., Seosan-si (KR); Keyang Electric Machinery Co., Ltd., Seoul (KR)

( * ) Notice: Subject to any disclaimer, the term of this patent is extended or adjusted under 35 U.S.C. 154(b) by 327 days.

(21) Appl. No.: 18/198,412

(22) Filed: May 17, 2023

(65) Prior Publication Data

US 2024/0149751 A1      May 9, 2024

(30)      Foreign Application Priority Data

Nov. 8, 2022    (KR) ........................ 10-2022-0147830

(51) Int. Cl.
 *B60N 2/02*      (2006.01)
 *B60N 2/22*      (2006.01)

(52) U.S. Cl.
 CPC ....... *B60N 2/02246* (2023.08); *B60N 2/2231* (2013.01); *B60N 2/02253* (2023.08); *B60N 2/0268* (2023.08)

(58) Field of Classification Search
 CPC .............. B60N 2/02246; B60N 2/2231; B60N 2/02253; B60N 2/0268; B60N 2/22;
(Continued)

(56) References Cited

FOREIGN PATENT DOCUMENTS

JP      20170206127 A   *   1/2017
KR      101684123 B1   12/2016
(Continued)

OTHER PUBLICATIONS

KR20210140928A—english (Year: 2021).*
(Continued)

*Primary Examiner* — Ian Jen
*Assistant Examiner* — Renee LaRose
(74) *Attorney, Agent, or Firm* — Banner & Witcoff, Ltd.

(57)      ABSTRACT

A dual release actuator for a vehicle seat includes a motor, a cable carrier configured to receive power of the motor, thereby rotating to selectively pull one of two different cables, a Hall sensor to sense rotation of the motor, and a controller configured to count a sensing pulse of the Hall sensor for controlling rotation of the motor.

16 Claims, 8 Drawing Sheets

(58) Field of Classification Search
CPC .......... B60N 2/20; B60N 2/0272; B60N 2/12;
B60N 2/02258; B60N 2/2209; B60N
2/2213; B60N 2/3009
See application file for complete search history.

(56) References Cited

FOREIGN PATENT DOCUMENTS

| | | | | |
|----|----|----|----|----|
| KR | 10-2018-0056042 A | | 5/2018 | |
| KR | 20210140928 A | * | 11/2021 | ........... B60N 2/2213 |
| WO | WO-2023282509 A1 | * | 1/2023 | ........... B60N 2/2213 |

OTHER PUBLICATIONS

JP2017206127A Seat Drive Device english (Year: 2017).*
WO2023282509A1 Release Actuator for Vehicle Seat—english
(Year: 2023).*

* cited by examiner

<Initial Position>       <Driving in       <Driving
                          Walk-in Direction>       in Folding Direction>

DUAL RELEASE ACTUATOR FOR VEHICLE SEAT AND METHOD FOR CONTROLLING THE SAME

CROSS-REFERENCE TO RELATED APPLICATION

This application claims the benefit of Korean Patent Application No. 10-2022-0147830, filed on Nov. 8, 2022, in the Korean Intellectual Property Office, the disclosure of which is incorporated herein by reference.

FIELD

The present disclosure relates to technology associated with an actuator configured to control behavior of a seat of a vehicle.

BACKGROUND

Some vehicles, such as a recreational vehicle (RV) or a three-door type vehicle, may have a front seat that has a walk-in function for allowing a passenger to easily get in or out of a rear seat.

A walk-in function of a seat is a function in which a front seat slides forward by a certain distance and/or (e.g., and at the same time) a seatback of the front seat may fold forwards through a certain angle so as to create a space allowing a passenger for the rear seat to easily get in or out of the rear seat. The walk-in function may be operated by manipulation of, for example, a walk-in lever or a walk-in switch of the front seat.

There may also be a seat folding, function which is a function distinguishable from the walk-in function. The seat folding function is a function allowing a seatback of a seat to be folded through an angle often greater than that of the walk-in function. Typically, the seatback may be folded to a position at which the seatback contacts a seat cushion. The folding angle of the seatback is able to be fixed by a recliner.

The above matters disclosed in this section are merely for enhancement of understanding the disclosure and should not be taken as an acknowledgement or any form of suggestion that the matters form the related art already known to a person skilled in the art.

SUMMARY

The following summary presents a simplified summary of certain features. The summary is not an extensive overview and is not intended to identify key or critical elements.

A dual release actuator, for a vehicle seat, may comprise: a motor; a cable carrier configured to: receive power from the motor, and rotate, based on the received power, so as to pull one of two cables; a Hall sensor configured to sense rotation of the motor; and a controller configured to: count a sensing pulse of the Hall sensor, and controlling, based on the count of the sensing pulse, rotation of the motor.

The dual release actuator may comprise a sensing magnet mounted at a rotation shaft of the motor, wherein the Hall sensor is configured to sense a variation in a magnetic field caused by rotation of the sensing magnet.

The dual release actuator may comprise a worm provided at a rotation shaft of the motor, wherein the cable carrier is configured to be concentrically coupled to a worm wheel engaged with the worm such that the cable carrier is integrated with the worm wheel.

The dual release actuator may comprise an arc-shaped guide slot formed in at least one of the cable carrier or the worm wheel, wherein the arc-shaped guide slot is configured to allow end blocks, provided at ends of the cables, to slide therealong.

The cable carrier may comprise a stopper protrusion configured to limit a rotation range of the cable carrier.

The controller may be configured to, based on a command for driving a device associated with a first one of the two cables, drive the motor to rotate the cable carrier by an operation distance in a direction in accordance with the command; and the arc-shaped guide slot of the cable carrier is configured to prevent an end block, of a second one of the two cables, from moving as the cable carrier rotates.

The controller may be configured to, after the cable carrier is rotated by the operation distance, cause rotating of the cable carrier in a reverse direction by the operation distance so that the cable carrier returns to an initial position.

The controller may be configured to: store, based on a power failure, a current position of the motor in a non-volatile memory, and cause, based on power being restored and using the stored current position, returning of the cable carrier to an initial position.

The controller may be configured to: based on having caused the returning of the cable carrier to the initial position, execute a received command by causing rotating, in a direction corresponding to the received command, the cable carrier to a position at which rotation of the cable carrier is prevented by a stopper protrusion; and update the initial position to be a position to which the cable carrier rotates reversely from the rotation-prevented position by the operation distance.

The controller may be further configured to, based on a second command for driving a second device associated with the second one of the two cables, drive the motor to rotate the cable carrier by the operation distance in a second direction, reverse to the direction in accordance with the command, in accordance with the second command, the command for driving the device associated with the first one of the two cables comprises one of: a walk-in command for releasing a locked state of a walk-in device of the vehicle seat; or a folding command for releasing a locked state of a folding device configured to fold a seatback of the vehicle seat, and the second command comprises the other one of the walk-in command or the folding command.

A method of controlling a dual release actuator for a vehicle seat may comprise: driving, by a controller and based on a walk-in command, a motor to cause a cable carrier to rotate in a walk-in direction by an operation distance, thereby pulling a walk-in cable to release a locked state of a walk-in device; driving, by the controller and after the driving the motor to cause the cable carrier to rotate in the walk-in direction by the operation distance, the motor to cause the cable carrier to rotate in a folding direction, reverse to the walk-in direction, by the operation distance, thereby returning the cable carrier to an initial position; driving, by the controller and based on a folding command, the motor to cause the cable carrier to rotate in the folding direction by the operation distance, thereby pulling a folding cable to release a locked state of a folding device; and driving, by the controller and after the driving the motor to cause the cable carrier to rotate in the folding direction by the operation distance, the motor to cause the cable carrier to rotate in the walk-in direction by the operation distance, thereby returning the cable carrier to the initial position.

The method may comprise storing, by the controller and based on a power failure, a current position of the motor in a non-volatile memory; and causing, by the controller and based on power being restored, the cable carrier to return to the initial position using the stored current position.

The method may comprise causing, by the controller and based on receipt of a walk-in command after the cable carrier returns to the initial position in response to the power failure, the cable carrier to rotate, in the walk-in direction, to a position at which rotation of the cable carrier is prevented by a stopper protrusion; and causing, by the controller, the cable carrier to rotate, from the position at which the rotation of the cable carrier is prevented by the stopper protrusion, in the folding direction by the operation distance to a resultant position; and updating the initial position to be the resultant position.

The method may comprise causing, by the controller and based on receipt of a folding command after the cable carrier returns to the initial position in response to the power failure, the cable carrier to rotate, in the folding direction, to a position at which rotation of the cable carrier is prevented by a stopper protrusion; and causing, by the controller, the cable carrier to rotate, from the position at which the rotation of the cable carrier is prevented by the stopper protrusion, in the walk-in direction by the operation distance to a resultant position; and updating the initial position to be the resultant position.

A method of controlling a dual release actuator for a vehicle seat may comprise: storing, by a controller and based on a power failure, information indicating a current position of a cable carrier; causing, by the controller and based on power being restored, the cable carrier to return to an initial position using the stored information; causing, by the controller and based on receipt of a walk-in command or a folding command after the cable carrier is returned to the initial position, rotating of the cable carrier in a direction corresponding to the walk-in command or the folding command until the rotation of the cable carrier is stopped by a stopper protrusion; and updating, by the controller, the initial position to be a resultant position to which the cable carrier rotates, in a reverse direction to the direction, by an operation distance from a position at which rotation of the cable carrier is prevented by the stopper protrusion.

The causing the rotating of the cable carrier in the direction corresponding to the walk-in command or the folding command until the rotation of the cable carrier is stopped by the stopper protrusion may comprise causing, by the controller and based on receipt of the walk-in command after the cable carrier is returned to the initial position, the cable carrier to rotate in a walk-in direction to the position at which rotation of the cable carrier is prevented by the stopper protrusion, and the updating the initial position to be the resultant position comprises: causing, by the controller, the cable carrier to rotate in a folding direction by the operation distance to the resultant position, and updating the initial position to be the resultant position.

The causing rotating of the cable carrier in the direction corresponding to the walk-in command or the folding command until the rotation of the cable carrier is stopped by the stopper protrusion may comprise causing, by the controller and based on receipt of the folding command after the cable carrier is returned to the initial position, the cable carrier to rotate in a folding direction to a position at which rotation of the cable carrier is prevented by the stopper protrusion, and the updating the initial position to be the resultant position comprises: causing, by the controller, the cable carrier to rotate in a walk-in direction by the operation distance to the resultant position; and updating the initial position to be the resultant position.

These and other features and advantages are described in greater detail below.

BRIEF DESCRIPTION OF THE DRAWINGS

Objects, features and other advantages of the present disclosure will be more clearly understood from the following detailed description taken in conjunction with the accompanying drawings, in which.

DETAILED DESCRIPTION

Figure 1:
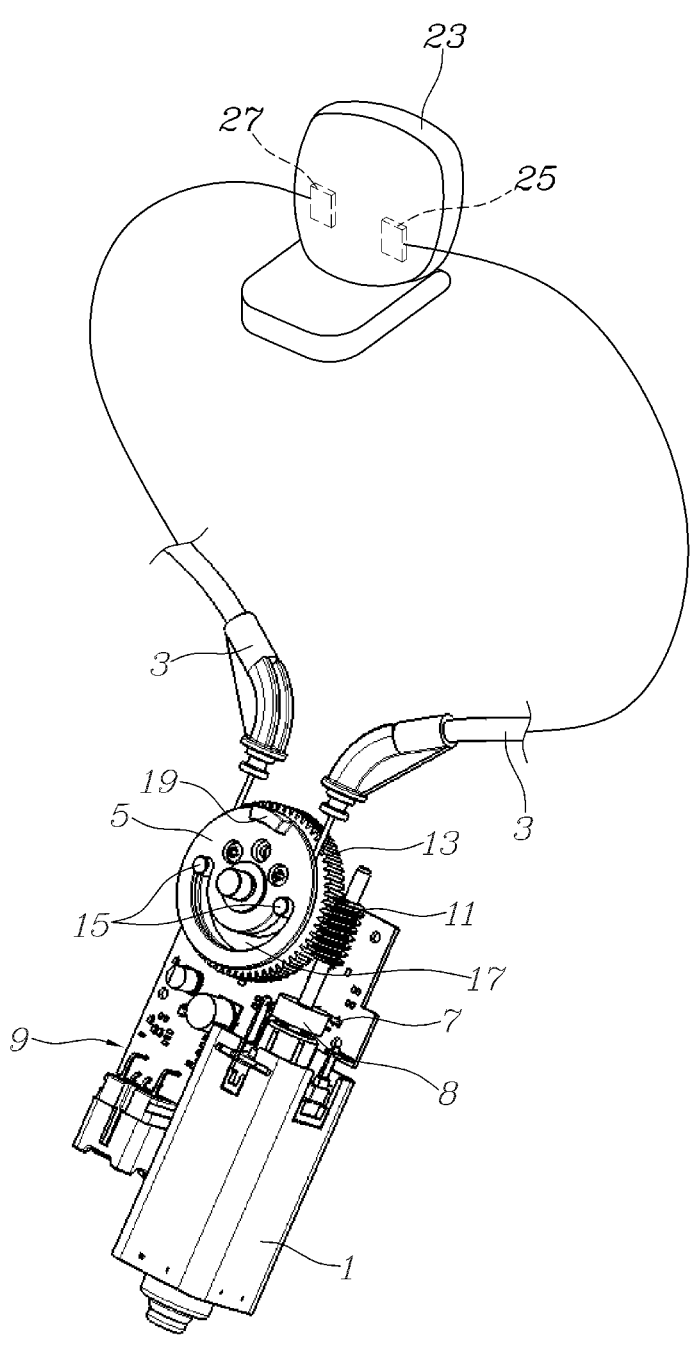
FIG. 1 is a view showing a dual release actuator for a vehicle seat according to an example of the present disclosure.

Hereinafter, examples of the present disclosure will be described in detail with reference to the accompanying drawings. The same or similar elements are designated by the same reference numerals and redundant description thereof will be omitted.

The suffixes "module" and "unit" of elements herein are used for convenience of description and thus can be used interchangeably and do not have any distinguishable meanings or functions.

In the present disclosure, moreover, a detailed description will be omitted when a specific description of publicly known technologies to which the disclosure pertains is judged to obscure the gist of the present disclosure. In addition, the accompanying drawings are provided to easily explain the spirit of the disclosure and, therefore, should not be construed as limiting the spirit of the disclosure to the accompanying drawings. On the contrary, the disclosure covers all modifications, equivalents, and alternatives falling within the spirit and scope of the disclosure as defined by the claims.

Although terms including an ordinal number, such as "first" or "second," may be used herein to refer to members of a plurality of constituent elements, the constituent elements are not limited to the terms, and the terms are used only for the purpose of discriminating one constituent element from other constituent elements.

When one element is referred to as being "connected to" or "coupled to" another element, the one element may be "connected to" or "coupled to" another element via a further element, or the one element may be directly connected to or directly coupled to another element, with no other element therebetween. On the other hand, when an element is referred to as being "directly connected to" or "directly coupled to" another element, there is no intervening element present.

As used in the description of the disclosure and the appended claims, singular forms are intended to include plural forms as well, unless context clearly indicates otherwise.

It will be further understood that the terms "comprises," "comprising," "includes," "including," "has", and/or "having, when used in this specification, specify the presence of stated features, regions, integers, steps, operations, elements, and/or combinations thereof, but do not preclude the presence or addition of one or more other features, regions, integers, steps, operations, elements, components, and/or combinations thereof.

Referring to FIGS. 1 to 5, a dual release actuator for a vehicle seat according to an example of the present disclosure may have a motor 1, a cable carrier 5 configured to rotate to selectively pull two different cables 3, a Hall sensor 7 configured to sense rotation of the motor 1, and a controller 9 configured to count a sensing pulse of the Hall sensor 7, and thereby control rotation of the motor 1.

A sensing magnet 8 may be mounted at a rotation shaft of the motor 1 and, as such, a variation in magnetic field caused by rotation of the sensing magnet 8 may be sensed by the Hall sensor 7. Accordingly, the Hall sensor 7 may be able to count a sensing pulse due to rotation of the motor 1.

A worm 11 may be provided at the rotation shaft of the motor 1. The cable carrier 5 may be configured to be concentrically coupled to a worm wheel 13 engaged with the worm 11 such that the cable carrier 5 is integrated with the worm wheel 13.

An arc-shaped guide slot 17 may be provided at at least one of the cable carrier 5 or the worm wheel 13, to allow an end block 15 provided at an end of each cable 3 to slide therealong.

Figure 3:
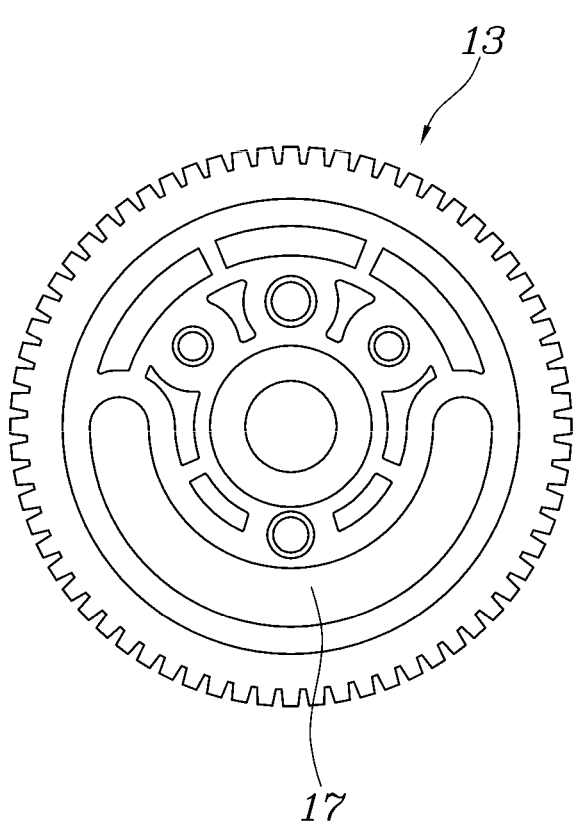
FIG. 3 is a view illustrating a worm wheel of FIG. 1.
Figure 4:
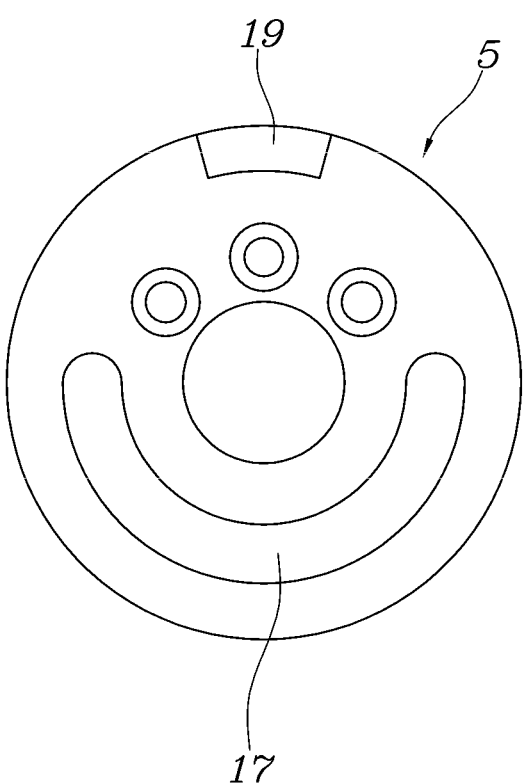
FIG. 4 is a view illustrating a cable carrier of FIG. 1.

In this example, as shown in FIGS. 3 and 4, arc-shaped guide slots 17 are formed in the worm wheel 13 and the cable carrier 5, respectively, such that the arc-shaped guide slots 17 correspond to each other. Accordingly, it may be possible for the end block 15 of each cable 3 to be guided by the arc-shaped guide slots 17 between the cable carrier 5 and the worm wheel 13.

Figure 2:
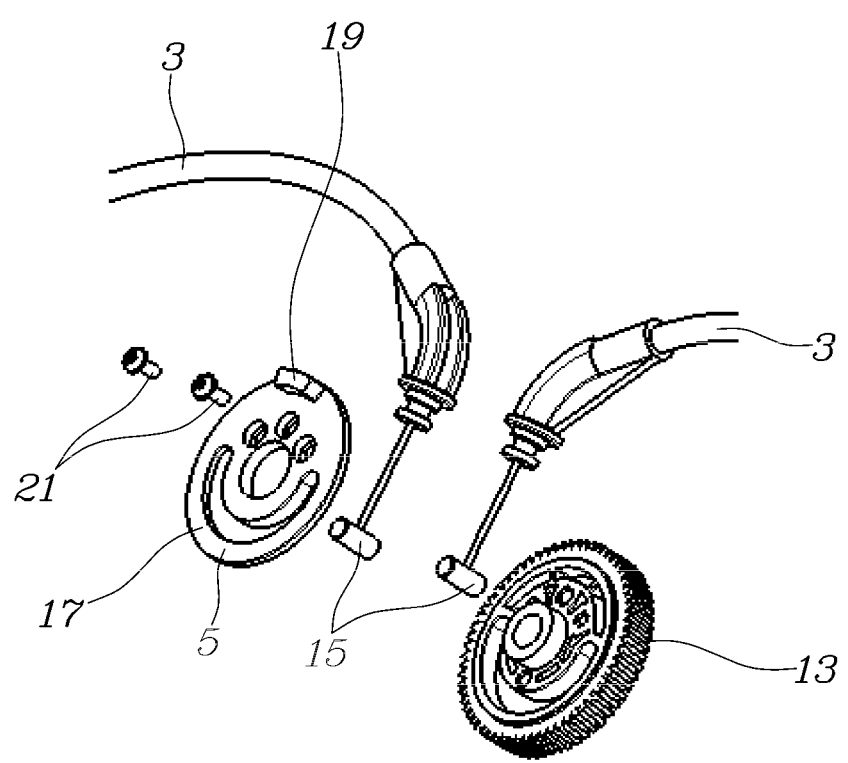
FIG. 2 is an exploded view of main constituent parts of the dual release actuator of FIG. 1.

A stopper protrusion 19 may be provided at the cable carrier 5, to limit a rotation range of the cable carrier 5. As shown in FIG. 2, the cable carrier 5 may be fastened to the worm wheel 13 by screws 21 or the like such that the cable carrier 5 is concentric to the worm wheel 13.

The controller 9 may be configured such that, when one of two commands for driving different devices respectively allocated to the two cables 3 is input, the controller 9 drives the motor 1 in order to rotate the cable carrier 5 by a predetermined operation distance in a direction that the cable 3 is pulled in accordance with the input command.

In addition, the arc-shaped guide groove 17 of the cable carrier 5 may be formed to prevent the end block 15 of the cable 3 not associated with the input command from moving when the cable 3 associated with the input command is pulled as the cable carrier 5 rotates.

In this example, the two commands for driving the different devices respectively allocated to the two cables 3 may include a walk-in command for releasing a locked state of a walk-in device 25 of a seat 23 for (e.g. equipped in) a vehicle, and a folding command for releasing a locked state of a folding device 27 configured to fold a seatback of the seat 23.

Figure 5:
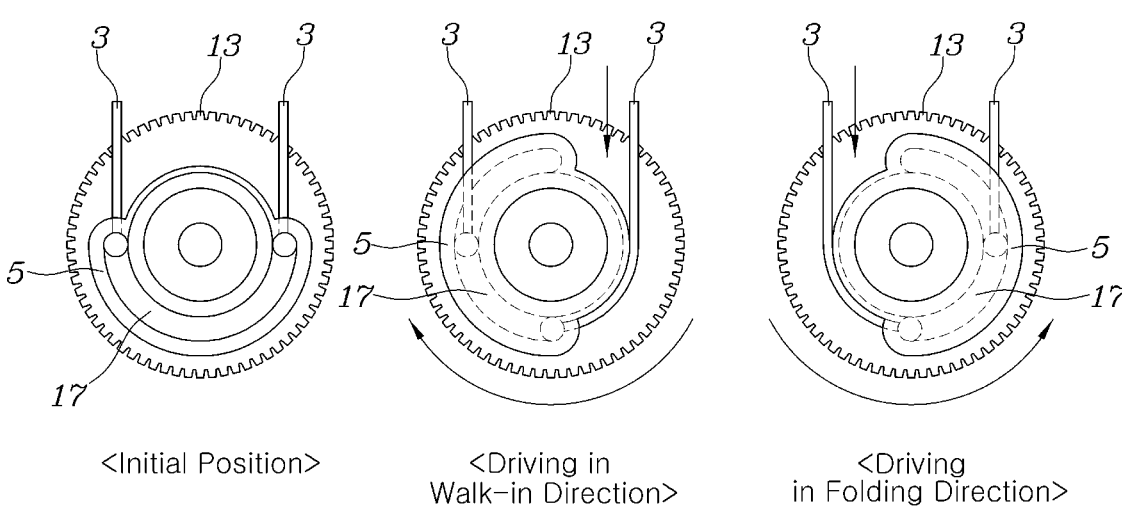
FIG. 5 is a view explaining comparative operations of the cable carrier and the work wheel.

Accordingly, referring to FIG. 5, when the walk-in command is input to the controller 9 in an initial state, the controller 9 may drive the motor 1 such that the cable carrier 5 rotates in a clockwise direction, the right cable 3 is pulled, thereby releasing a locked state of the walk-in device 25. The left cable 3 may be maintained in the initial state during this operation of the right cable.

When the folding command is input to the controller 9 in an initial state, the controller 9 drives the motor 1 such that the cable carrier 5 rotates in a counterclockwise direction, the left cable 3 is pulled, thereby releasing a locked state of the folding device 27. In this case, the right cable 3 is still maintained in an initial state.

Thus, the dual release actuator for a vehicle seat according to the example of the present disclosure may be used to selectively drive the two different devices as described above.

For reference, in FIG. 5, only a portion of the cable carrier 5, at which the arc-shaped guide slot 17 is formed, is briefly shown as having a shape different from that of FIGS. 1, 2, and 4.

The controller 9 may be configured such that, after rotating the cable carrier 5 by the operation distance for pulling of the cable 3 associated with the input command, the controller 9 may rotate the cable carrier 5 in a reverse direction, thereby returning the cable carrier 5 to an initial position.

That is, as shown in FIG. 5, after the controller 9 receives the walk-in command, and then performs walk-in driving for rotating the cable carrier 5 in the clockwise direction through driving of the motor 1, the controller 9 reversely rotates the motor 1, thereby returning the cable carrier 5 to the initial position, and, as such, waits for the next command.

The operation distance may be determined through learning when the actuator initially operates. When the actuator initially operates, for example, the motor 1 may rotate in one direction to a first position corresponding to a position at which the stopper protrusion 19 of the cable carrier 5 is unable to move past an object (such as a housing of the actuator, etc.) and in a reverse direction to a second position where, during rotation of the stopper protrusion 19 of the cable carrier 5 according to rotation of the motor 1 in a reverse direction, further rotation of the stopper protrusion 19 is prevented due to an object such as the housing of the actuator, etc. The operation distance may correspond to a value obtained by dividing a distance between the first position and the second position by 2.

The controller 9 may store the learned operation distance. When the walk-in command or the folding command is input, the controller 9 may execute the input command by rotating the cable carrier 5 by the operation distance in a direction corresponding to the input command. The controller 9 may then returns the cable carrier 5 to the initial position by reversely rotating the motor 1 by the operation distance.

Of course, the operation distance is not limited to the learned value, and any value may be stored in the controller 9, e.g., by inputting the value to the controller 9.

The controller 9 may be configured such that the controller 9 stores the current position of the motor 1 in a non-volatile memory, such as an electrically-erasable programmable read-only memory (EEPROM) when power failure occurs, and/or when the motor otherwise stalls. As such, the controller 9 may subsequently return the cable carrier 5 to the initial position using the stored position of the motor 1 when power is again supplied, and/or when the motor is again functional.

The controller 9 may be able to trace a position of the motor 1 during rotation of the cable carrier 5 through driving of the motor 1 by counting a sensing pulse generated by the Hall sensor 7. When a failure, such as a cutoff of power occurs, the controller 9 may rapidly store a position of the motor 1 corresponding to a currently counted value. When power is subsequently again supplied, the controller 9 may return the cable carrier 5 to the initial position using the stored position of the motor 1.

The controller 9 may be configured such that, upon receiving one of the commands allocated to the two cables 3, after returning the cable carrier 5 to the initial position in response to power failure, the controller 9 executes the received command by rotating the cable carrier 5 to a position at which rotation of the cable carrier 5 is prevented by the stopper protrusion 19 in a direction corresponding to execution of the received command. The controller 9 may also be configured to update, as the initial position, a position to which the cable carrier 5 rotates reversely from the rotation-prevented position by the operation distance.

That is, for example, although the controller 9 may execute the walk-in command when the walk-in command is input immediately after performing the procedure for returning the cable carrier 5 to the initial position in response to occurrence of power failure, execution of the walk-in command is not achieved by rotating the motor 1 such that the cable carrier 5 rotates by the operation distance, but is achieved by rotating the cable carrier 5 until rotation of the cable carrier 5 is prevented by the stopper protrusion 19, and the controller 9 then again sets, as the initial position, a position to which the cable carrier 5 rotates reversely from the rotation-prevented position by the operation distance.

Even if generation of a sensing pulse counted by the Hall sensor 7 is stopped immediately after the actuator is stopped (e.g., due to power failure), the motor 1 may slightly further rotate (e.g., due to inertia) by a rotation amount that may be very difficult to accurately measure. For this reason, when the cable carrier 5 is returned from an actual position, at which the motor 1 has been stopped, to the initial position using the position of the motor 1 stored in the non-volatile memory, there may be an error in terms of initial position. The controller 9 may be configured to operate as described above avoids this problem.

As described above, the dual release actuator for a vehicle seat according to the example of the present disclosure may accurately, automatically return to the initial position even after a situation such as power failure, etc. occurs, without using a spring for returning the actuator to the initial position on a power transmission path from the motor 1 to the cable carrier 5, as in conventional cases.

In addition, in the actuator according to the example of the present disclosure, a load of the actuator pulling the cables 3 may be reduced because no spring is used. As such, gear reduction ratios of the worm 11 and the worm wheel 13 with reference to the motor 1 may be relatively small, as compared to the case in which a motor having the same grade as that of the motor 1 is used. Accordingly, a fast response time may be secured even when the driving speed of the motor 1 is not excessively high.

Accordingly, in the actuator according to the example of the present disclosure, noise of the motor 1 may be reduced during operation of the present disclosure, durability of the entirety of the actuator may be enhanced, and fabrication of the actuator may be achieved using a reduced number of parts. In addition, there are advantages in terms of costs, ease of assembly, productivity, and packaging.

In addition, in the actuator according to the example of the present disclosure, the operation distance of the cables 3 may be varied through position learning. In accordance with such a variable operation distance, it may be possible to operate devices to be manipulated without forcing the devices to reach a forced mechanical restraint position.

In accordance with the above-described characteristics, durability of the actuator according to the example of the present disclosure may be further enhanced, and the actuator may be easily applied to other systems configured to vary an operation distance.

Figure 6:
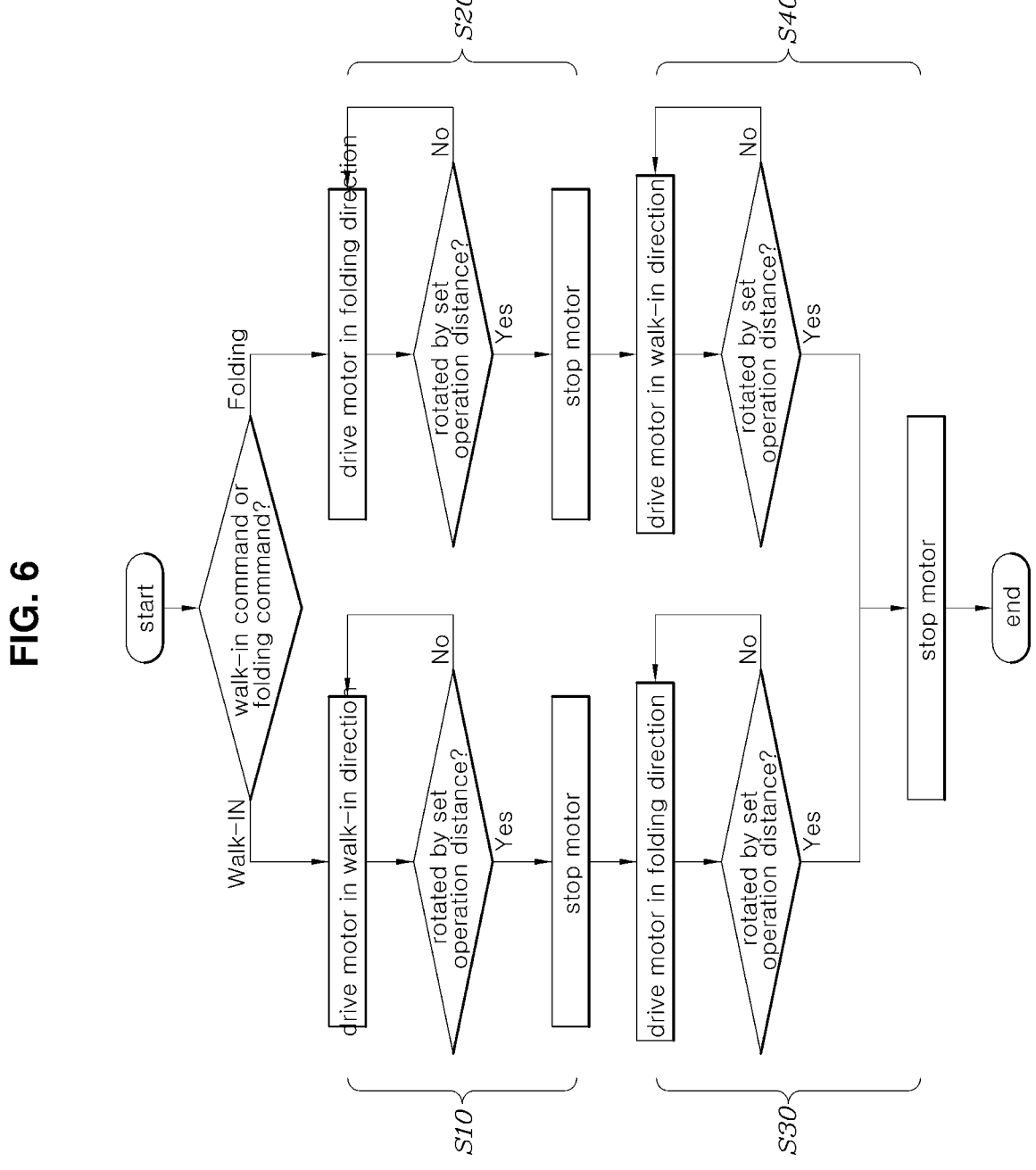
FIG. 6 is a flowchart showing a method for controlling the dual release actuator for a vehicle seat in accordance with an example of the present disclosure.

Referring to FIG. 6, a method of controlling the dual release actuator for a vehicle seat in accordance with an example of the present disclosure may include driving the motor 1 by the controller 9 when a walk-in command is input such that the cable carrier 5 pulls the walk-in cable 3 while rotating in a walk-in direction by a predetermined operation distance, thereby releasing a locked state of the walk-in device 25 (S10), driving the motor 1 by the controller 9 when a folding command is input such that the cable carrier 5 pulls the folding cable 3 while rotating in a folding direction reverse to the walk-in direction by the operation distance, thereby releasing a locked state of the folding device 27 (S20), rotating the motor 1 by the controller 9 in the folding direction by the operation distance when the cable carrier 5 has rotated by the operation distance in accordance with the walk-in command, thereby returning the cable carrier 5 to an initial position (S30), and rotating the motor 1 by the controller 9 in the walk-in direction by the operation distance when the cable carrier 5 has rotated by the operation distance in accordance with the folding command, thereby returning the cable carrier 5 to the initial position (S40).

Figure 7:
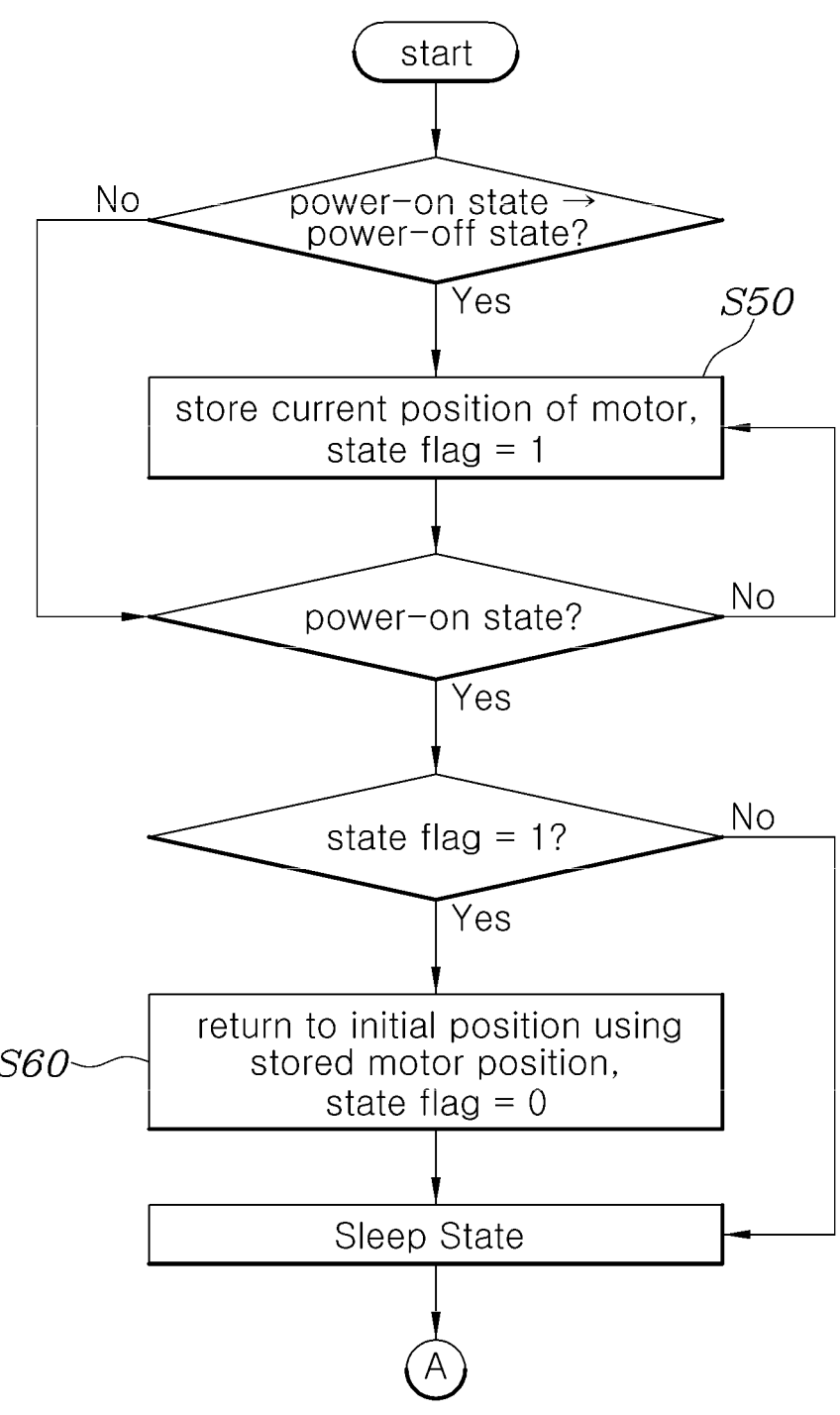
FIG. 7 and FIG. 8 are flowcharts showing a method for controlling the dual release actuator for a vehicle seat in accordance with another example of the present disclosure implemented when power failure occurs.
Figure 8:
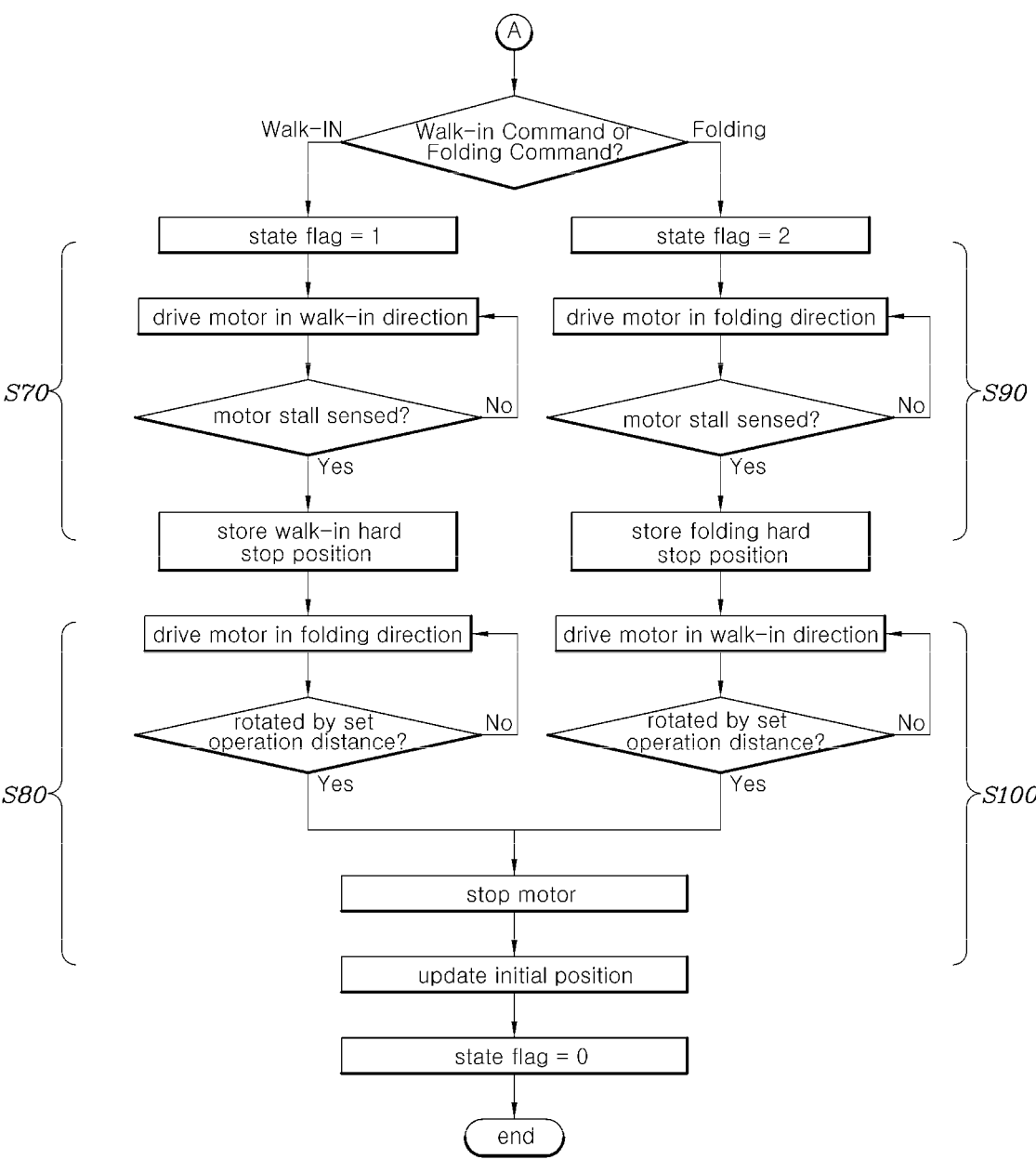

As shown in FIGS. 7 and 8, the method may further include storing a current position of the motor 1 in a non-volatile memory by the controller 9 when power failure occurs during execution of the walk-in command or the folding command (S50), and returning the cable carrier 5 to the initial position by the controller 9 using the stored position of the motor 1 when power is again supplied (S60).

In addition, method may also, or alternatively, include rotating, by the controller 9, the cable carrier 5 in the walk-in direction to a position at which rotation of the cable carrier 5 is prevented by the stopper protrusion 19 in a case that the walk-in command is input after the cable carrier 5 returns to the initial position in response to power failure (S70). The method may further include rotating, by the controller 9, the cable carrier 5 in the folding direction by the operation distance, and updating the resultant position of the cable carrier 5 as the initial position (S80).

In addition, the method may include rotating, by the controller 9, the cable carrier 5 in the folding direction to a position at which rotation of the cable carrier 5 is prevented by the stopper protrusion 19 when the folding command is input after the cable carrier 5 returns to the initial position in response to power failure (S90). The method may include rotating, by the controller 9, the cable carrier 5 in the walk-in direction by the operation distance, and updating the resultant position of the cable carrier 5 as the initial position (S100).

A method of controlling the dual release actuator for a vehicle seat in accordance with another example may also, or alternatively, include storing a current position of the motor 1 in a non-volatile memory by the controller 9 based on (e.g., in response to) a power failure occurring during execution of the walk-in command or the folding command (S50). The controller 9 may return the cable carrier 5 to the initial position using the stored position of the motor 1 based on (e.g., in response to) power again being supplied (S60). The controller 9 may rotate (e.g., cause the motor to rotate) the cable carrier 5 in a direction corresponding to execution of the walk-in command or the folding command until the rotation of the cable carrier 5 is stopped by the stopper protrusion 19 when the walk-in command or the folding command is input after the cable carrier 5 returns to the initial position (S70 or S90). The controller may update the initial position as a position to which the cable carrier 5 rotates reversely by a predetermined operation distance from a position, at which rotation of the cable carrier 5 is prevented by the stopper protrusion 19 (S80 or S100).

That is, the controller 9 may perform rotation of the cable carrier 5 in a walk-in direction to a position at which rotation of the cable carrier 5 is prevented by the stopper protrusion 19 in response to the walk-in command being input after the cable carrier 5 returns to the initial position (S70), and rotation of the cable carrier 5 in the folding direction by the operation distance. The resultant position of the cable carrier 5 may be used as the initial position (S80).

In addition, the controller 9 performs rotation of the cable carrier 5 in the folding direction to a position, at which rotation of the cable carrier 5 is prevented by the stopper protrusion 19, when the folding command is input after the cable carrier 5 returns to the initial position (S90), and rotation of the cable carrier 5 in the walk-in direction by the operation distance, and updating the resultant position of the cable carrier 5 as an updated initial position (S100).

It is an object of the present disclosure to provide a dual release actuator for a vehicle seat and a method of controlling the same which are capable of selectively performing a command for releasing a locked state of a walk-in device configured to perform a walk-in function of a seat and a command for releasing a locked state of a folding device configured to perform a folding function of the seat.

In accordance with an aspect of the present disclosure, the above and other objects can be accomplished by the provision of a dual release actuator for a vehicle seat including a motor, a cable carrier configured to receive power of the motor, thereby rotating to selectively pull two different cables, a Hall sensor installed to sense rotation of the motor, and a controller configured to count a sensing pulse of the Hall sensor, thereby controlling rotation of the motor.

A sensing magnet may be mounted at a rotation shaft of the motor, and the Hall sensor may sense a variation in magnetic field caused by rotation of the sensing magnet.

A worm may be provided at a rotation shaft of the motor. The cable carrier may be configured to be concentrically coupled to a worm wheel engaged with the worm such that the cable carrier is integrated with the worm wheel.

An arc-shaped guide slot may be provided at at least one of the cable carrier and the worm wheel, to allow an end block provided at an end of each of the cables to slide therealong.

A stopper protrusion may be provided at the cable carrier, to limit a rotation range of the cable carrier.

The controller may be configured such that, when one of two commands for driving different devices respectively allocated to the two cables is input, the controller drives the motor in order to rotate the cable carrier by a predetermined operation distance in a direction that the cable is pulled in accordance with the input command. The arc-shaped guide groove of the cable carrier may be formed to prevent the end block of the cable not associated with the input command from moving when the cable associated with the input command is pulled as the cable carrier rotates.

The controller may be configured such that, after rotating the cable carrier by the operation distance, for pulling of the cable associated with the input command, the controller rotates the cable carrier in a reverse direction, thereby returning the cable carrier to an initial position.

The controller may be configured such that the controller stores a current position of the motor in a non-volatile memory when power failure occurs, and subsequently returns the cable carrier to the initial position using the stored position of the motor when power is again supplied.

The controller may be configured such that, upon receiving one of the commands allocated to the two cables after returning the cable carrier to the initial position in response to power failure, the controller executes the received command by rotating the cable carrier to a position, at which rotation of the cable carrier is prevented by the stopper protrusion, in a direction corresponding to execution of the received command. The controller may be configured to update, as the initial position, a position to which the cable carrier rotates reversely from the rotation-prevented position by the operation distance.

The two commands for driving the different devices respectively allocated to the two cables may include a walk-in command for releasing a locked state of a walk-in device of the seat equipped in a vehicle, and a folding command for releasing a locked state of a folding device configured to fold a seatback of the seat.

In accordance with another aspect of the present disclosure, there is provided a method of controlling a dual release actuator for a vehicle seat, the method including driving a motor by a controller when a walk-in command is input such that a cable carrier pulls a walk-in cable while rotating in a walk-in direction by a predetermined operation distance, thereby releasing a locked state of a walk-in device, driving the motor by the controller when a folding command is input such that the cable carrier pulls a folding cable while rotating in a folding direction reverse to the walk-in direction by the operation distance, thereby releasing a locked state of a folding device, rotating the motor by the controller in the folding direction by the operation distance when the cable carrier has rotated by the operation distance in accordance with the walk-in command, thereby returning the cable carrier to an initial position, and rotating the motor by the controller in the walk-in direction by the operation distance when the cable carrier has rotated by the operation distance in accordance with the folding command, thereby returning the cable carrier to the initial position.

The method may further include storing a current position of the motor in a non-volatile memory by the controller when power failure occurs during execution of the walk-in command or the folding command, and returning the cable carrier to the initial position by the controller using the stored position of the motor when power is again supplied.

The method may further include rotating, by the controller, the cable carrier in the walk-in direction to a position, at which rotation of the cable carrier is prevented by a stopper protrusion, when the walk-in command is input after the cable carrier returns to the initial position in response to power failure, and rotating, by the controller, the cable carrier in the folding direction by the operation distance, and updating a resultant position of the cable carrier as the initial position.

The method may further include rotating, by the controller, the cable carrier in the folding direction to a position, at which rotation of the cable carrier is prevented by a stopper protrusion, when the folding command is input after the cable carrier returns to the initial position in response to power failure, and rotating, by the controller, the cable carrier in the walk-in direction by the operation distance, and updating a resultant position of the cable carrier as the initial position.

In accordance with a further aspect of the present disclosure, there is provided a method of controlling a dual release actuator for a vehicle seat, the method including storing a current position of the motor in a non-volatile memory by a controller when power failure occurs during execution of a walk-in command or a folding command, returning a cable carrier to an initial position by the controller using the stored position of the motor when power is again supplied, rotating, by the controller, the cable carrier in a direction corresponding to execution of the walk-in command or the folding command until the rotation of the cable carrier is stopped by a stopper protrusion when the walk-in command or the folding command is input after the cable carrier returns to the initial position, and updating, by the controller, a position, to which the cable carrier rotates reversely by a predetermined operation distance from a position, at which rotation of the cable carrier is prevented by the stopper protrusion, as the initial position.

The method may further include rotating, by the controller, the cable carrier in a walk-in direction to a position, at which rotation of the cable carrier is prevented by the stopper protrusion, when the walk-in command is input after the cable carrier returns to the initial position, and rotating, by the controller, the cable carrier in a folding direction by the operation distance, and updating a resultant position of the cable carrier as the initial position.

The method may further include rotating, by the controller, the cable carrier in a folding direction to a position, at which rotation of the cable carrier is prevented by the stopper protrusion, when the folding command is input after the cable carrier returns to the initial position, and rotating, by the controller, the cable carrier in a walk-in direction by the operation distance, and updating a resultant position of the cable carrier as the initial position.

As apparent from the above description, the present disclosure provides a dual release actuator for a vehicle seat capable of selectively executing a command for releasing a locked state of a walk-in device configured to perform a walk-in function for a seat and a command for releasing a locked state of a folding device configured to perform a folding function for a seat.

In addition, the actuator of the present disclosure reduces load thereof through exclusion of a spring for return to an initial position and, as such, may transmit power of a motor to a cable carrier in a relatively low gear reduction ratio, as compared to conventional cases. Accordingly, it may be possible to secure a fast response time while reducing the rotation speed of the motor. Consequently, operation noise may be reduced through a reduction in the speed of the motor.

Furthermore, it may be possible to automatically return the cable carrier to an initial position when power failure occurs and to update the initial position of the cable carrier through appropriate learning. Accordingly, accurate and stable operability may always be secured.

Although the specific examples of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A dual release actuator, for a vehicle seat, comprising:
a motor;
a cable carrier configured to:
receive power from the motor, and rotate, based on the received power, so as to pull one of two cables;
a worm provided at a rotation shaft of the motor, wherein the cable carrier is configured to be concentrically coupled to a worm wheel engaged with the worm such that the cable carrier is integrated with the worm wheel, wherein an arc-shaped guide slot formed in a coupled portion between the cable carrier and the worm wheel, wherein the arc-shaped guide slot is configured to commonly receive and allow sliding of end blocks respectively provided at ends of the two cables, and wherein the cable carrier comprises a stopper protrusion configured to limit a rotation range of the cable carrier and the worm wheel;
a Hall sensor configured to sense rotation of the motor; and
a controller configured to:
count a sensing pulse of the Hall sensor, and
control, based on the count of the sensing pulse, rotation of the motor.

2. The dual release actuator according to claim 1, further comprising a sensing magnet mounted at a rotation shaft of the motor, wherein the Hall sensor is configured to sense a variation in a magnetic field caused by rotation of the sensing magnet.

3. The dual release actuator according to claim 1, wherein the controller is configured to:
store, based on a power failure, a current position of the motor in a non-volatile memory, and
cause, based on power being restored and using the stored current position, returning of the cable carrier to an initial position.

4. The dual release actuator according to claim 3, wherein the controller is configured to store the current position of the motor further based on the count of the sensing pulse, and wherein the stored current position of the motor corresponds to a counted value.

5. The dual release actuator according to claim 1, wherein:
the controller is configured to, based on a command for driving a device associated with a first one of the two cables, drive the motor to rotate the cable carrier by an operation distance in a direction in accordance with the command; and
the arc-shaped guide slot of the cable carrier is configured to prevent an end block, of a second one of the two cables, from moving as the cable carrier rotates.

6. The dual release actuator according to claim 5, wherein the controller is configured to, after the cable carrier is rotated by the operation distance, cause rotating of the cable carrier in a reverse direction by the operation distance so that the cable carrier returns to an initial position.

7. A dual release actuator, for a vehicle seat, comprising:
a motor;
a cable carrier configured to:
receive power from the motor, and
rotate, based on the received power, so as to pull one of two cables;
a Hall sensor configured to sense rotation of the motor; and
a controller configured to:
count a sensing pulse of the Hall sensor, and
control, based on the count of the sensing pulse, rotation of the motor,
wherein the controller is configured to:
store, based on a power failure, a current position of the motor in a non-volatile memory, and cause, based on power being restored and using the stored current position, returning of the cable carrier to an initial position.

8. The dual release actuator according to claim 7, wherein the controller is configured to:

based on having caused the returning of the cable carrier to the initial position, execute a received command by causing rotating, in a direction corresponding to the received command, the cable carrier to a position at which rotation of the cable carrier is prevented by a stopper protrusion; and update the initial position to be a position to which the cable carrier rotates reversely from the rotation-prevented position by an operation distance.

9. The dual release actuator according to claim 5, wherein:

the controller is further configured to, based on a second command for driving a second device associated with the second one of the two cables, drive the motor to rotate the cable carrier by the operation distance in a second direction, reverse to the direction in accordance with the command, in accordance with the second command, the command for driving the device associated with the first one of the two cables comprises one of:

a walk-in command for releasing a locked state of a walk-in device of the vehicle seat; or a folding command for releasing a locked state of a folding device configured to fold a seatback of the vehicle seat, and the second command comprises the other one of the walk-in command or the folding command.

10. A method of controlling a dual release actuator for a vehicle seat, the method comprising:

storing, by a controller and based on a power failure, information indicating a current position of a cable carrier;

causing, by the controller and based on power being restored, the cable carrier to return to an initial position using the stored information;

causing, by the controller and based on receipt of a walk-in command or a folding command after the cable carrier is returned to the initial position, rotating of the cable carrier in a direction corresponding to the walk-in command or the folding command until the rotation of the cable carrier is stopped by a stopper protrusion; and updating, by the controller, the initial position to be a resultant position to which the cable carrier rotates, in a reverse direction to the direction, by an operation distance from a position at which rotation of the cable carrier is prevented by the stopper protrusion.

11. The method according to claim 10, wherein:

the causing the rotating of the cable carrier in the direction corresponding to the walk-in command or the folding command until the rotation of the cable carrier is stopped by the stopper protrusion comprises causing, by the controller and based on receipt of the walk-in command after the cable carrier is returned to the initial position, the cable carrier to rotate in a walk-in direction to the position at which rotation of the cable carrier is prevented by the stopper protrusion, and the updating the initial position to be the resultant position comprises:

causing, by the controller, the cable carrier to rotate in a folding direction by the operation distance to the resultant position, and updating the initial position to be the resultant position.

12. The method according to claim 10, wherein:

the causing rotating of the cable carrier in the direction corresponding to the walk-in command or the folding command until the rotation of the cable carrier is stopped by the stopper protrusion comprises causing, by the controller and based on receipt of the folding command after the cable carrier is returned to the initial position, the cable carrier to rotate in a folding direction to a position at which rotation of the cable carrier is prevented by the stopper protrusion, and the updating the initial position to be the resultant position comprises:

causing, by the controller, the cable carrier to rotate in a walk-in direction by the operation distance to the resultant position; and updating the initial position to be the resultant position.

13. The method according to claim 10, further comprising:

counting a sensing pulse of a Hall sensor, and controlling, based on the counting of the sensing pulse, rotation of a motor coupled to the cable carrier.

14. The method according to claim 10, further comprising:

counting a sensing pulse of a Hall sensor;

based on the power failure and the counting of the sensing pulse, storing, in a memory, a current position of a motor coupled to the cable carrier; and causing, based on power being restored, the cable carrier to return to the initial position using the stored current position.

15. The method according to claim 14, wherein the stored current position of the motor corresponds to a counted value associated with the Hall sensor.

16. The dual release actuator according to claim 3, wherein the controller is configured to store the current position of the motor further based on the count of the sensing pulse, and wherein the stored current position of the motor corresponds to a counted value associated with the Hall sensor.

* * * * *